United States Patent
Gallagher (10) Patent No.: US 10,808,870 B2
(45) Date of Patent: Oct. 20, 2020

(54) ACCESS PANEL WITH CLEANOUT

(71) Applicant: David Gallagher, Seven Hills, OH (US)

(72) Inventor: David Gallagher, Seven Hills, OH (US)

(73) Assignee: David Gallagher, Seven Hills, OH (US)

( * ) Notice: Subject to any disclaimer, the term of this patent is extended or adjusted under 35 U.S.C. 154(b) by 0 days.

(21) Appl. No.: 16/006,745

(22) Filed: Jun. 12, 2018

(65) Prior Publication Data

US 2018/0356008 A1 Dec. 13, 2018

Related U.S. Application Data

(60) Provisional application No. 62/518,037, filed on Jun. 12, 2017.

(51) Int. Cl.
*F16L 5/00* (2006.01)
*F16L 45/00* (2006.01)

(52) U.S. Cl.
CPC ............... *F16L 5/00* (2013.01); *F16L 45/00* (2013.01)

(58) Field of Classification Search
CPC ........................................................ F16L 5/00
USPC ..................................... 138/89, 109
See application file for complete search history.

(56) References Cited

U.S. PATENT DOCUMENTS

| | | | | |
|---|---|---|---|---|
| 565,320 | A * | 8/1896 | Barratt | F16K 37/0008 137/553 |
| 1,592,382 | A * | 7/1926 | Munn | E03C 1/122 138/89 |
| 3,620,257 | A * | 11/1971 | Wright, Jr. | F16L 55/10 138/89 |
| 4,303,101 | A * | 12/1981 | Tholen | F16L 55/132 138/89 |
| 4,360,041 | A * | 11/1982 | Hagan | F16L 45/00 137/247.43 |
| 4,614,065 | A * | 9/1986 | Papp | E02D 29/1409 404/26 |
| 4,701,089 | A * | 10/1987 | Nettel | F16B 37/14 411/373 |
| 4,883,590 | A * | 11/1989 | Papp | E03F 5/041 |
| 6,116,285 | A * | 9/2000 | Wilson | F16L 55/1108 138/89 |
| 7,281,411 | B2 * | 10/2007 | Brewer | F17D 5/02 73/49.1 |
| 7,464,727 | B1 * | 12/2008 | Larson | F16L 55/1108 138/89 |
| 9,453,331 | B1 * | 9/2016 | Buffington | E03F 5/041 |
| 2008/0271411 | A1 * | 11/2008 | Ledvina | F23J 13/08 52/750 |

\* cited by examiner

*Primary Examiner* — Craig M Schneider
*Assistant Examiner* — David R Deal (57) ABSTRACT

An access panel with cleanout includes a planar member, a pipe, a fastener, a closing member, and a cover. The planar member has a bottom surface and a top surface, with an opening extending therethrough. The pipe is coupled to the opening of the planar member, with an opening of the pipe being spaced from a top surface of the planar member. The fastener is associated with the opening of the pipe. The closing member is for coupling with the fastener of the pipe to close the pipe. The cover is for covering the opening of the planar member.

14 Claims, 14 Drawing Sheets

ACCESS PANEL WITH CLEANOUT

CROSS-REFERENCE TO RELATED APPLICATION

This application claims priority to U.S. Provisional Application No. 62/518,037, filed on Jun. 12, 2017, the disclosure of which is incorporated herein by reference in its entirety.

FIELD

The examples described herein concern an access panel with cleanout, used in everyday sewer and drain construction, home construction and home improvement projects.

BACKGROUND

A cleanout is an access point for a drain or sewer line in a building, sidewalk, driveway, etc. It is a location where a drain or sewer line can be easily accessed to inspect, scope, and snake to clear out clogs. Cleanouts can be located on the side of a building or in a basement, among other locations. They can be located in the floor or on a wall. The cleanout location in a home or building will vary depending upon the building style and the geographic climate of the locale.

When a building's plumbing systems get backed up, it typically involves a blockage in the main drain line to the civic sewer system or to a septic drain field. During backup, the cleanout will be full to the brim with water and sewage such that when you remove the plug, all the water and debris will bubble and flow out into the surrounding space. This is why it is often a good idea to have multiple cleanout locations in a building structure. Most homes and buildings are built with cleanouts. However, they can get "lost" in the drywall or covered up by home additions or renovations.

The main cleanout is usually a large-diameter pipe with a threaded plug in the top. It may be extended above the ground near an outside wall or contained inside a ground box covered by a metal cover. In homes with slab foundations, the main drain may be located in a bathroom, usually on the floor near a toilet, or in a garage or utility area, usually near a floor drain. In these locations, the threaded plug may be flush-mounted into the floor or may be threaded into a short length of large-diameter pipe extending up from the floor. The plug can be removed with a large pipe wrench to provide access for drain-clearing tools. In homes in colder climates, the cleanout may be located in a basement. The main cleanout is usually found in a basement floor, usually near a foundation wall. A threaded plug fits into a short length of large-diameter pipe that extends up from the floor.

SUMMARY

A cleanout with access panel is shown and described.

DETAILED DESCRIPTION

The present invention concerns a dual-purpose access panel 10 with cleanout 12 that can be used in a horizontal or a vertical orientation. In a first embodiment, shown in FIGS. 1-11, the panel has a planar member 14 having a top surface 16 and a bottom surface 18. The top surface 16 will align with a wall or floor and includes a centrally-disposed cleanout pipe 20 that extends through the panel 10 transverse to the top surface 16 of the planar member 14. The cleanout pipe 20 can be coupled with another pipe 22 that is positioned in a wall or floor and provides access to the other pipe 22. The cleanout pipe 20 of the access panel 10 includes a plug 24 having screw threads 26 that screw into the cleanout pipe 20 to close the opening 28 of the cleanout 12 so that gases, fluid, and sewage may not escape from the pipe through the opening of the cleanout 12. The plug 24 serves as a means for cleaning, viewing, or snaking out the pipe 22 that is coupled to the cleanout 12.

The cleanout portion 12 of the access panel 10 is recessed into the apparatus and the access panel 10 covers the opening 30 of the panel 10. If the access panel 10 is attached to a floor and is horizontally oriented, it could be coupled to a drain or piping that runs under the floor. If the access panel 10 is vertically orientated, it could be coupled to a vertical pipe that runs through the wall, for example.

Figure 1:
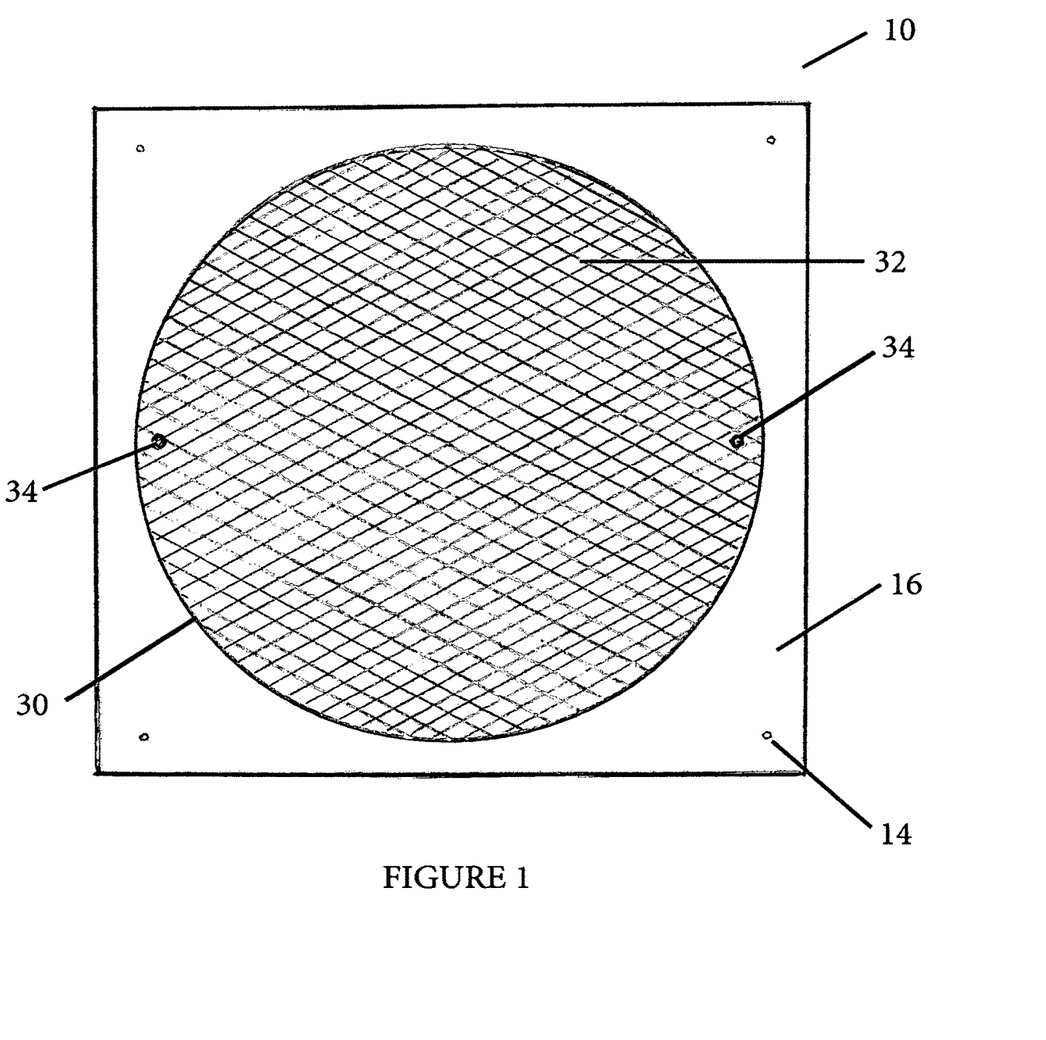
FIG. 1 depicts a top view of an access panel having a cover installed in the access panel opening. The view is representative of what would be seen on a wall or floor.

FIG. 1 shows a top view of the access panel 10 with a cover 32 installed on the panel 10. This view is representative of what would be seen on a wall or floor. The access panel 10 has a square outer periphery with a round cover 32 that is seated in a recessed opening 30 of the panel 10. Two screw holes 34 are provided for coupling the cover 32 to the opening 30 of the access panel 10.

Figure 2:
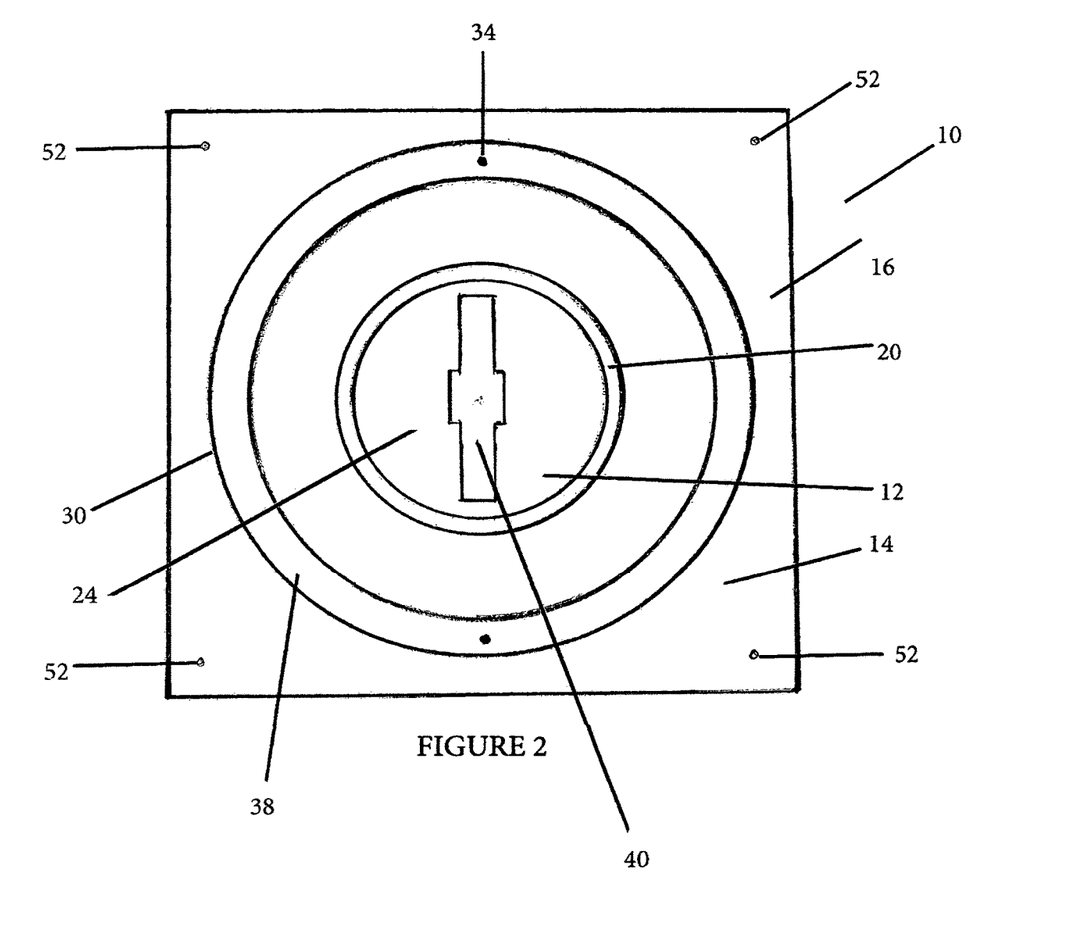
FIG. 2 depicts a top view of the access panel with the cover removed, showing a flush cap.

FIG. 2 depicts a top view of the access panel 10 with the cover 32 removed, showing a flush cap 36 positioned at the cleanout pipe opening 28. The interior of the access panel 10 shows a recessed lip 38 on which the cover 32 seats and an interior that is curved from below the lip to where it joins with the cleanout pipe 20. The flush cap 36 includes a slot 40 that can be used to open the cap 36.

Figure 3:
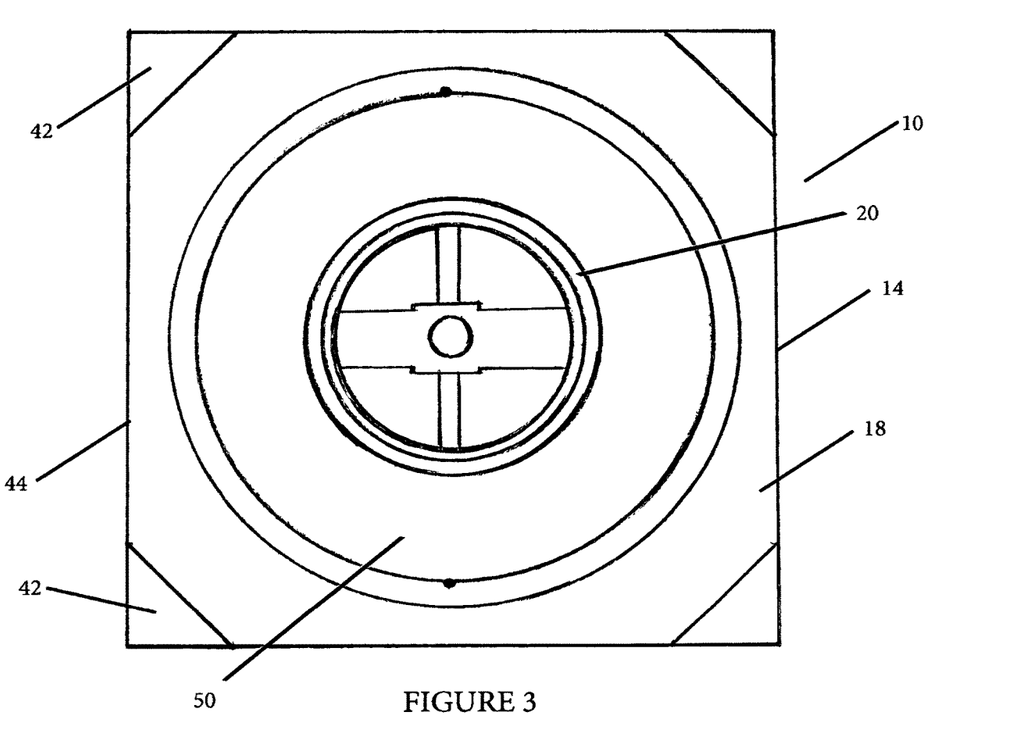
FIG. 3 depicts a bottom view of the access panel showing a pipe extending from the bottom of the cleanout, with a cap installed over the opening of the pipe.

FIG. 3 depicts a bottom view of the access panel 10 showing the cleanout pipe 20 extending from the bottom surface 18 of the access panel 10. The bottom surface 18 of the cap 36 is also shown. This embodiment shows four tabs 40 that are positioned on the bottom surface 18 of the access panel 10 at the corners of the access panel 10. These tabs 42 are used for spacing, as discussed below. In addition, the bottom surface 18 of the access panel 10 may have a downwardly extending lip 44 around the periphery thereof, as shown. The lip 44 has a thickness that is less than a thickness of the tabs 42.

Figure 4:
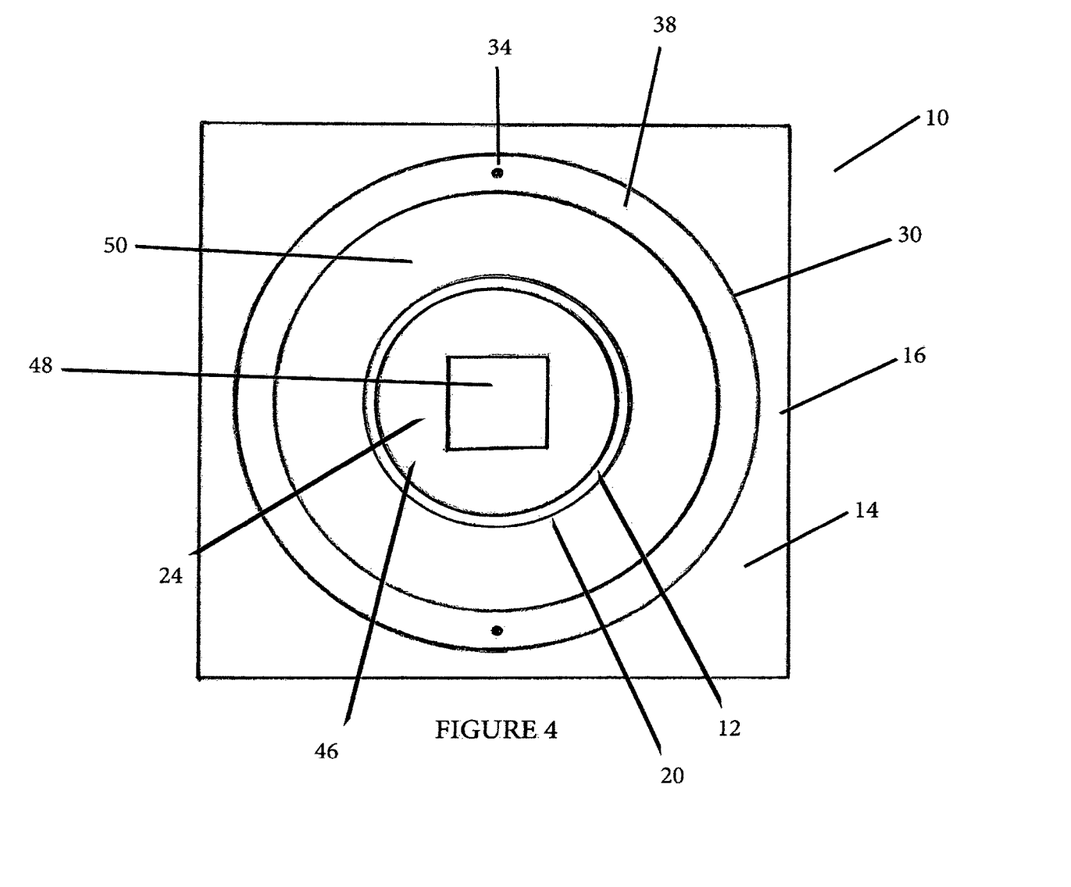
FIG. 4 is a top view of the access panel showing the cover removed with a different cap than previously shown. The cap shown has a block for aiding in grasping the cap to unscrew the cap from the threads of the cleanout pipe.
Figure 5:
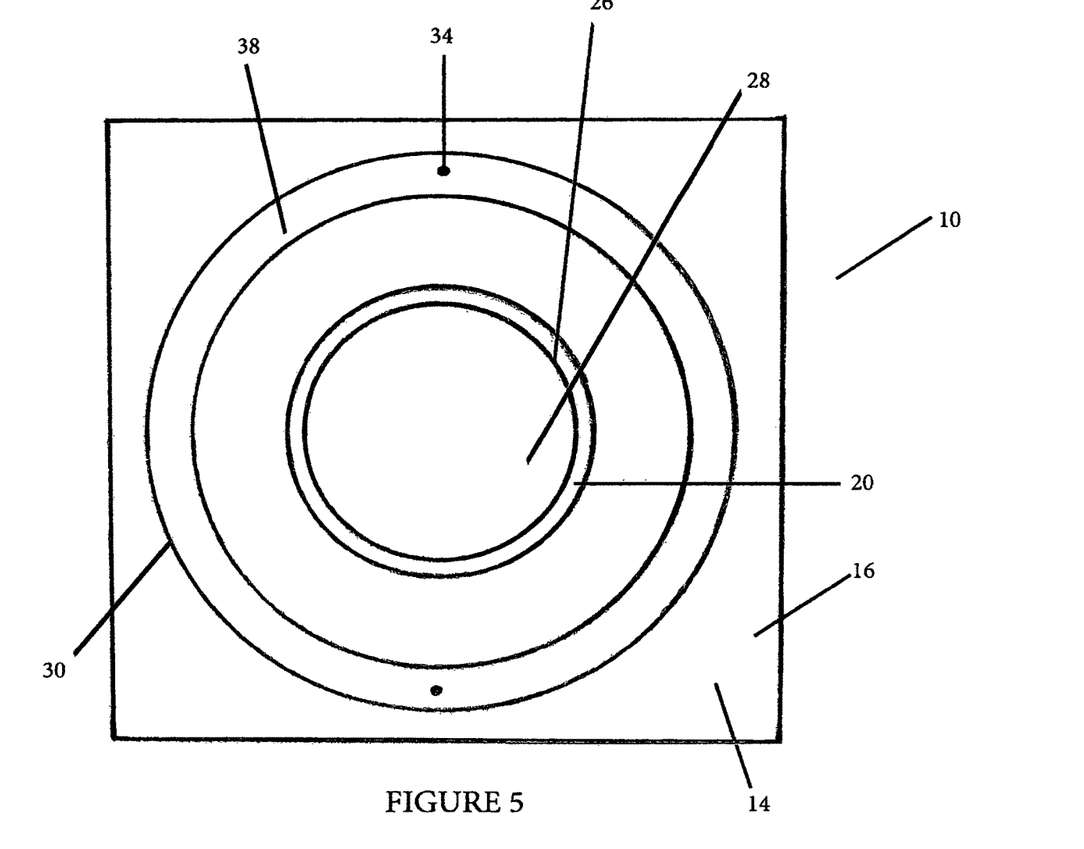
FIG. 5 is a top view of the access panel of FIG. 2 with the cap removed.
Figure 6:
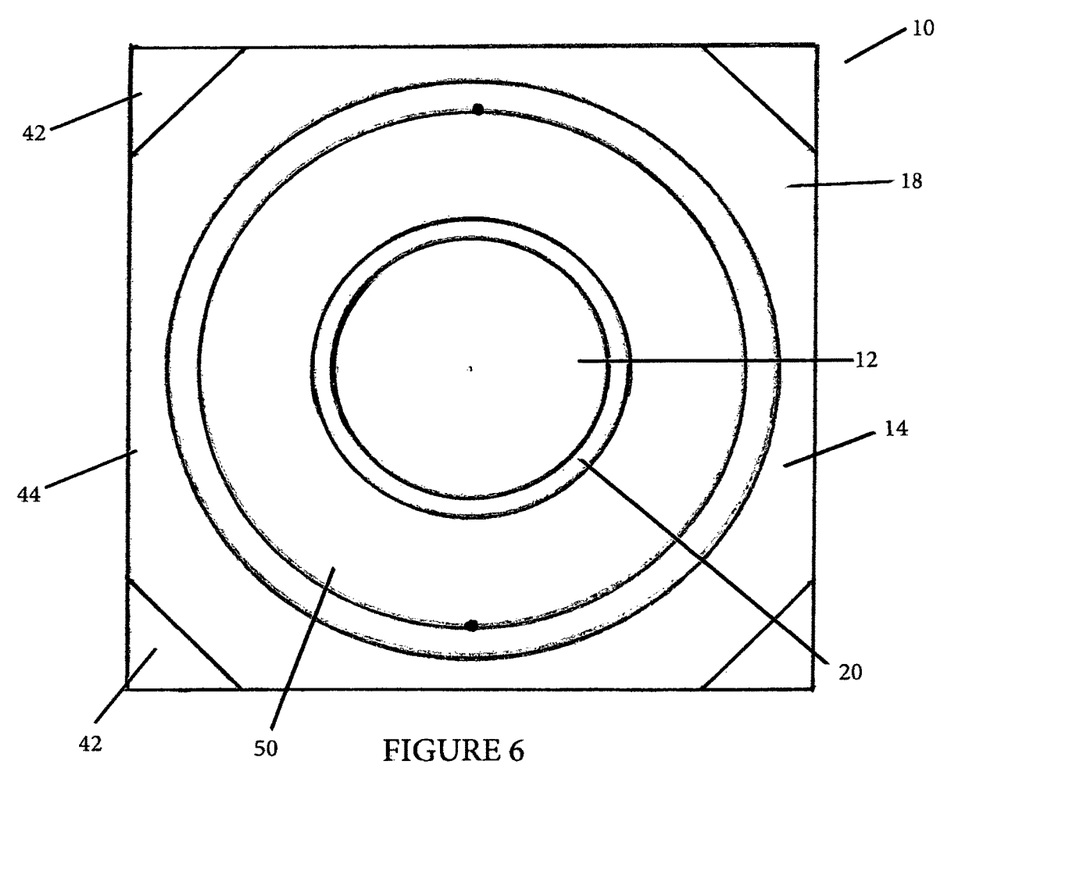
FIG. 6 is a bottom view of the access panel of FIG. 2 with the cap removed.

FIG. 4 depicts the access panel 10 with the cover 32 removed and with a different type of cap 46 installed on the cleanout opening 28. The cap 46 shown has a block 48 for aiding in grasping the cap 46 to unscrew the cap 46 from the threads 26 of the cleanout pipe opening 28. FIGS. 5 and 6 depict the opening 28 of the cleanout showing screw threads 26 that are used to couple the plug 46 to the cleanout opening 28.

Figure 7:
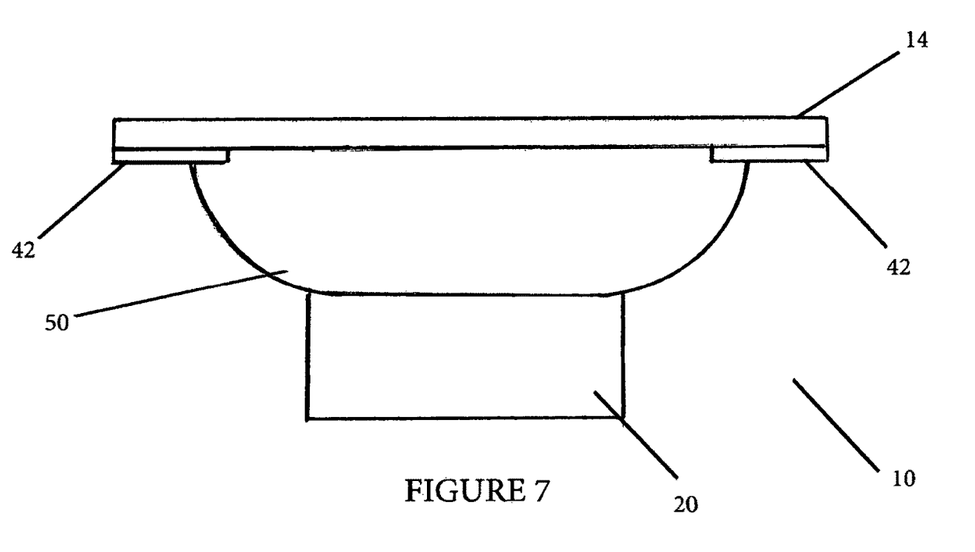
FIG. 7 is a side view of the access panel showing tabs positioned at the corners under the access panel.

FIG. 7 depicts a side view of the unit showing a molded, integrated basin 50, a molded pipe cleanout 20, as well as the top access panel 10 with tabs 42 extending downwardly from the corners of the access panel 10. The molded, integrated basin 50 is bell-shaped, but could be other shapes. The bell-shaped member 50 permits a user easier access to the plug 36, 46 on the cleanout opening 28 so that it can be removed without interference from the access panel 10.

Figure 8:
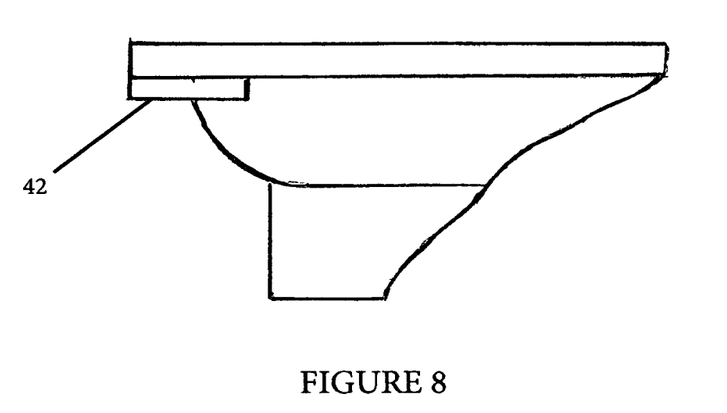
FIG. 8 is an enlarged view of a tab on the bottom surface of the access panel as shown in FIGS. 6 and 7.
Figure 9:
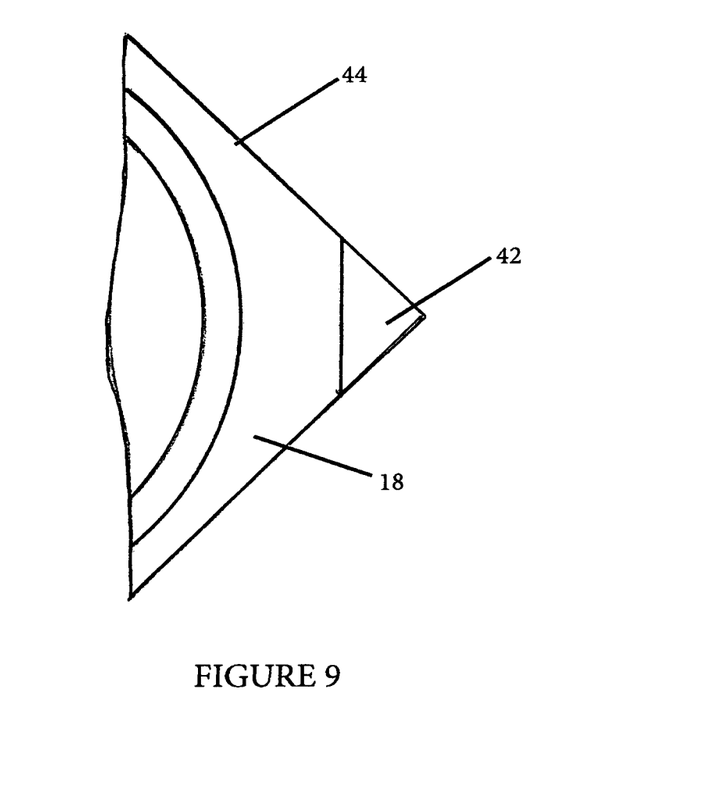
FIG. 9 is an enlarged bottom view of a tab, showing the peripheral shape as being triangular. The tabs could be solid, as shown, or not solid, such as a V-shape that conforms to the outer periphery of the access panel.

As shown best in FIGS. 7-9, the tabs 42 are molded, ⅝ inch tabs, or feet, on a lower surface 18 of the planar member 14 of the access panel unit 10. The tabs 42 act as risers or spacers so that the planar member 14 does not need to be of the same thickness as the various materials it is used with (e.g. drywall, tile, etc.). The feet 42 allow the planar member 14 to sit flush with the various materials it is used with when used in a wall application and can be manipulated (e.g. cut) to accommodate various material height finishes. The tabs 42 shown are triangular in shape, but other sizes and shapes could be used. The invention is, once again, not limited to the shapes shown. The planar member 14 can be fixed in position to accommodate a flush finish with the materials being used adjacent the planar member 14, either by being screwed through the surface of the planar member 14 to framing or being glued to the existing pipework.

The tabs 42 are depicted as shown as being triangular and solid. The tabs 42 do not need to be solid and could be other shapes, such as a V-shape that conforms to the outer periphery of the access panel 10 (not shown).

Figure 10:
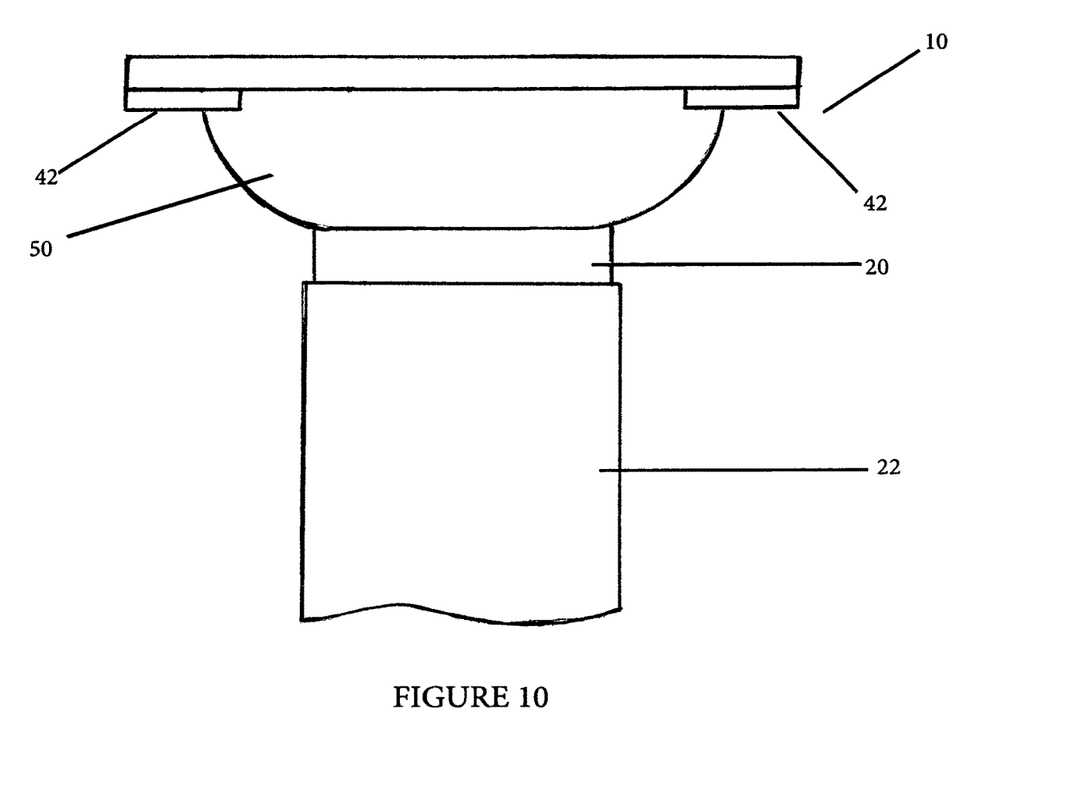
FIG. 10 depicts a side view of the access panel coupled to a pipe. This view is representative of an access panel positioned in a floor with a pipe coupled to the bottom of the access panel. In this case, the lower end of the access panel seats inside the pipe.

FIG. 10 depicts a side view of the cleanout pipe 20 of the access panel 10 coupled to another pipe 22. This view is representative of an access panel 10 positioned in a floor with a pipe 22 coupled to the bottom of the cleanout pipe 20. The lower end of the cleanout pipe 20 seats inside and is coupled with another pipe 22. Any type of coupling may be used to couple the cleanout pipe 20 to another pipe 2. There may be times when the cleanout pipe 20 and the pipe 22 to be coupled to are the same diameter, in which case a coupling may be used to couple the two parts together (not shown).

The access panel 10 shown in the figures is square, with four screw depression indicators 52 and a round cover 32. The cover 32 is attached to the body of the access panel 10 by screws or other fasteners.

The access panel 10 has a removable cover plate 32 to access the cleanout 28. The cleanout 28 shown is recessed below the cover 32. A screw cap or cleanout cap 36, 46 is shown attached to the pipe 20 inside the access panel 10. The pipe 20 includes threads 26 for mating with the cap 36, 46. The cap 36, 46 may have a recess 40 for receiving a tool to turn the cap 36 or the cap 46 may have an outwardly extending block 48 that can be accessed by a tool to turn the cap and unscrew it from the threads 26. Another type of fastener or mechanism other than standard screw threads may be used, if desired.

Figure 11:
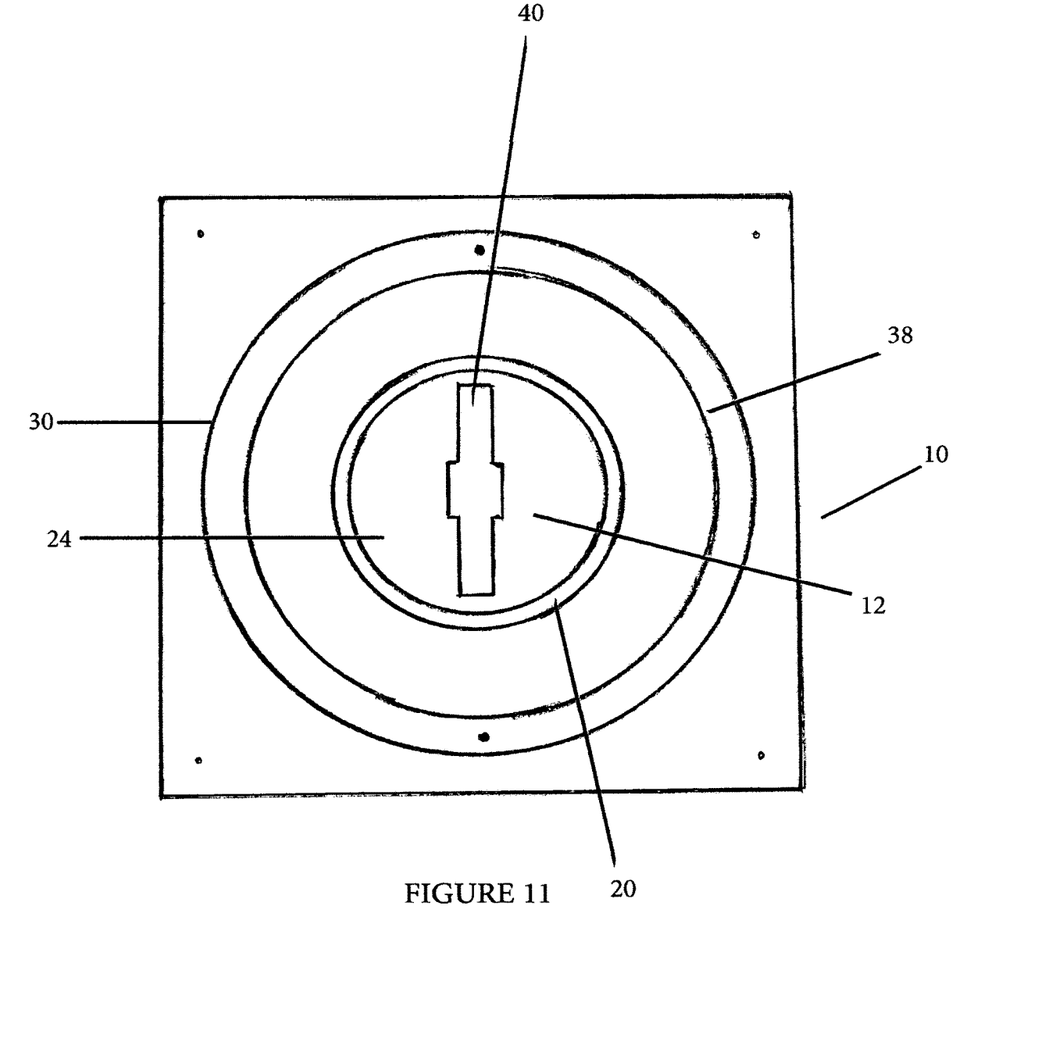
FIG. 11 depicts a top perspective view of the access panel unit with the cap installed in the pipe. The design shown is representative of an embodiment where the pipe helps to support the cover of the access panel when the unit is exposed to heavy traffic. The screw cap is recessed slightly into the pipe such that the pipe supports any weight applied to the cover. A reveal is positioned around the exterior of the pipe such that the cap is recessed slightly below the top of the pipe.

In another embodiment, shown in FIG. 11, the cleanout height is extended and, as such, the rim of the pipe sits just below the cover 32 of the access panel 10 and provides support to the cover 32. In this case, the screw cap 54 is below the rim of the pipe, creating a reveal. The rim of the pipe may serve to reinforce the access panel cover 32, particularly when the access panel 10 is positioned in a floor, sidewalk, or any other area where it is subject to heavy traffic.

Figure 12:
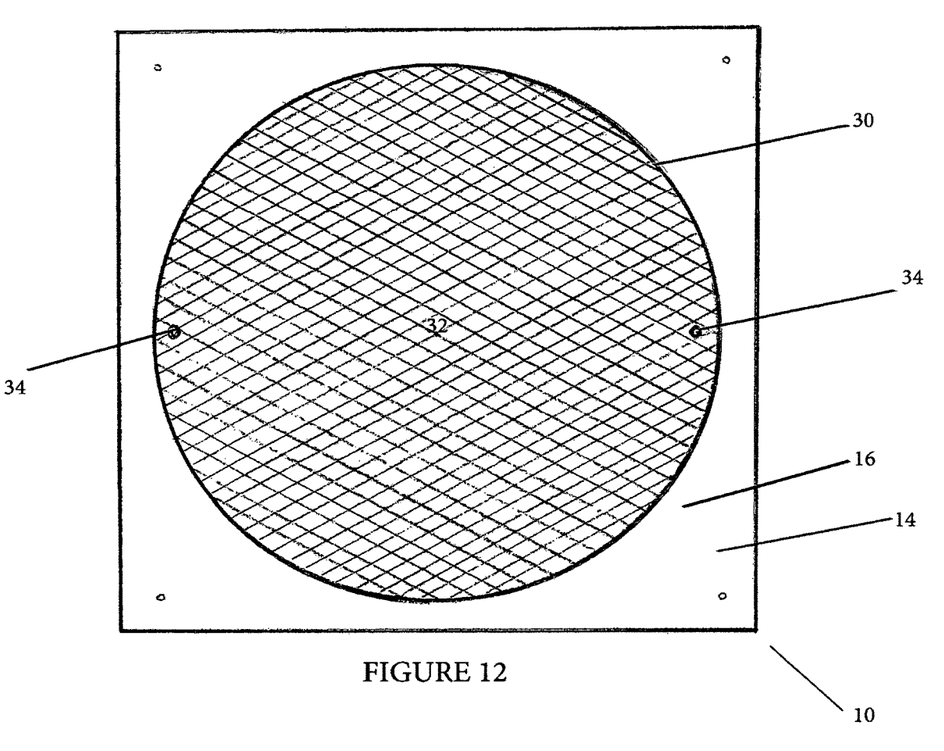
FIG. 12 is a top view of an alternative embodiment of the access panel where the access panel has four points of attachment at the respective corners of the access panel.
Figure 13:
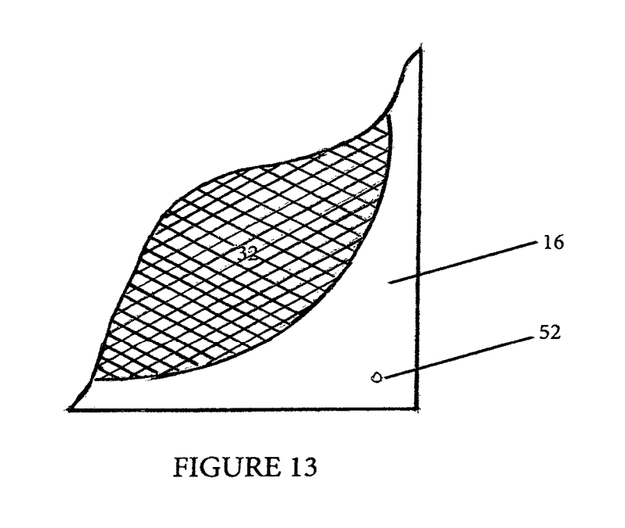
FIG. 13 is an enlarged view of one of the points of attachment shown in FIG. 12.

An alternative embodiment to use of the tabs as spacers is shown in FIGS. 12-16. FIG. 12 depicts the access panel 10 having four points of attachment 56 at the respective corners of the access panel 10. FIG. 13 depicts an enlarged view of one of the attachment points 56 and shows that it has a round opening and is generally cylindrical in shape such that it provides additional height to the access panel 10 when needed to fill a space. For example, with thicker drywall applications or with thicker floors, it may be necessary to have a thicker access panel. The attachment points 56 serve as spacers that can be used for thicker surfaces. With thinner drywall or thinner floors, a thinner access panel may be necessary, in which case the installer can shorten the attachment points/cylinders by cutting them or by grinding them down.

The access panel 10 of this embodiment, like the prior embodiment, also has four screw depressions 52 that can be used to couple the access panel 10 to an opening in a wall or floor. Alternatively, screws may be inserted into the attachment points 56.

In this embodiment, the four attachment points 56 are coupled at respective corners of the access panel 10. The attachment points 56 are circular or tubular in shape and are attached to the planar member 14 at the four corners thereof. These points of attachment 56 can be used in a similar manner to the tabs 42 discussed above to accommodate various thicknesses required for a particular application. The tubular members 56 can be cut off depending on how much height is needed relative to the installation. For taller installations, the members 56 can remain at full height. For shorter installations, the members 56 can be cut down to the same height as the height of the planar member 14.

Figure 14:
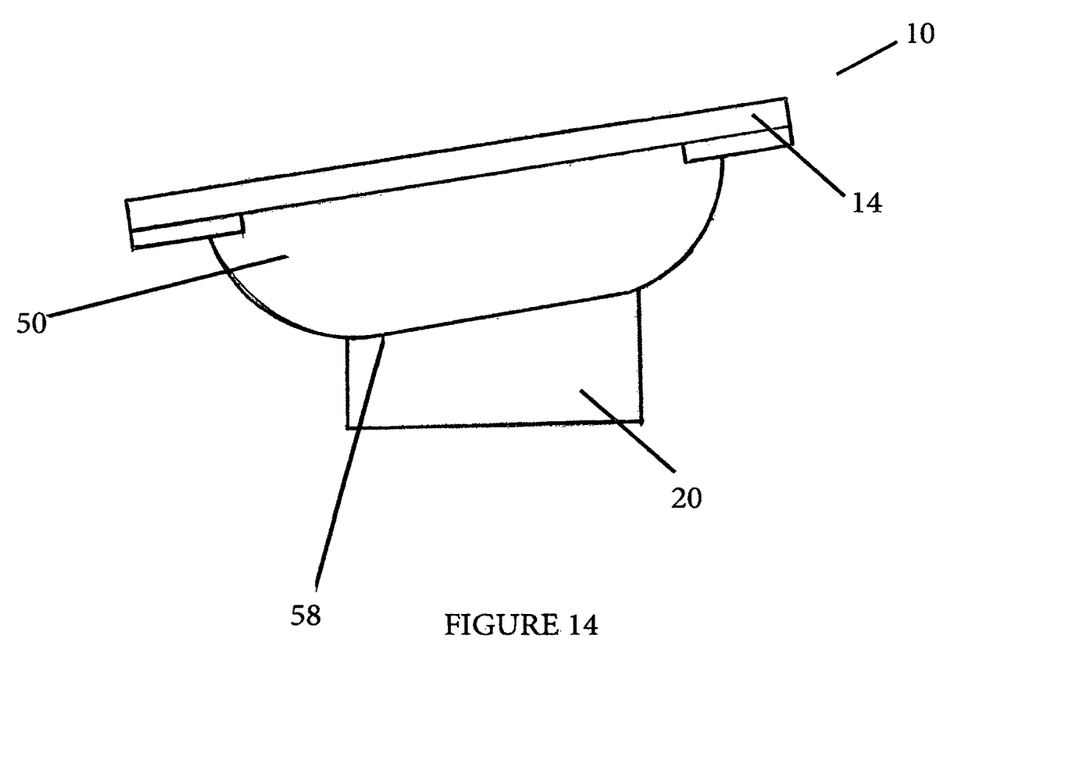
FIG. 14 is a side view of another alternative embodiment of the access panel showing how the bell housing around the cleanout can be rotated to different positions to accommodate different orientations.

Another feature of this embodiment is that it has a rotatable bell housing or basin 50. As shown in FIG. 14, the access panel 10 has a bell-shaped bottom member that extends downwardly from the top planar member 14 and the cleanout pipe 20 extends through an opening 58 in the bell-shaped member 50. In prior embodiments, the top surface 16 of the planar member 14 was perpendicular to longitudinal axis of the cleanout pipe 20 and the bell-shaped bottom member 50 of the access panel 10 was fixed to the cleanout pipe 20.

In this embodiment, the bottom of the bell-shaped member 50 is not fixed to the cleanout pipe 20 and is rotatable and swivels relative to the pipe 20 to permit the top planar member 14 to be rotated relative to the cleanout pipe 20 at various angles. This allows the unit to accommodate different drain slopes (pitch) in walls and floors, so that the base of the fitting sits flush with any surface in which it is installed. The planar member 14 of the access panel 10 can rotate 360 degrees around the cleanout pipe 20 and tilt to any angle the installer may require. While not shown, the lower end of the bell-shaped member 50 could include a wiper or soft material, such as silicone, molded into the lower end to form a closer connection to the pipe 20 while still allowing the bell-shaped member 50 to rotate, tilt and move relative to the cleanout pipe 20. The bell-shaped member 50 has a larger diameter at the top end where it attaches to the planar member and a smaller diameter at the lower end where it encircles the cleanout pipe 20.

Figure 15:
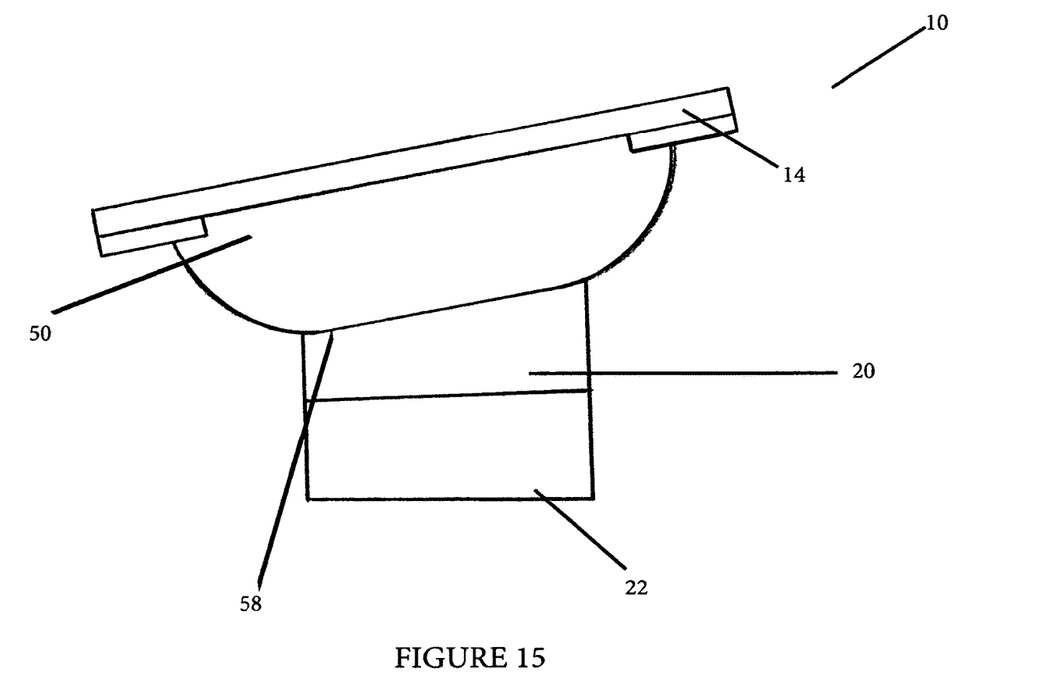
FIG. 15 is another view of the embodiment shown in FIG. 14, with the cleanout being coupled to another pipe.
Figure 16:
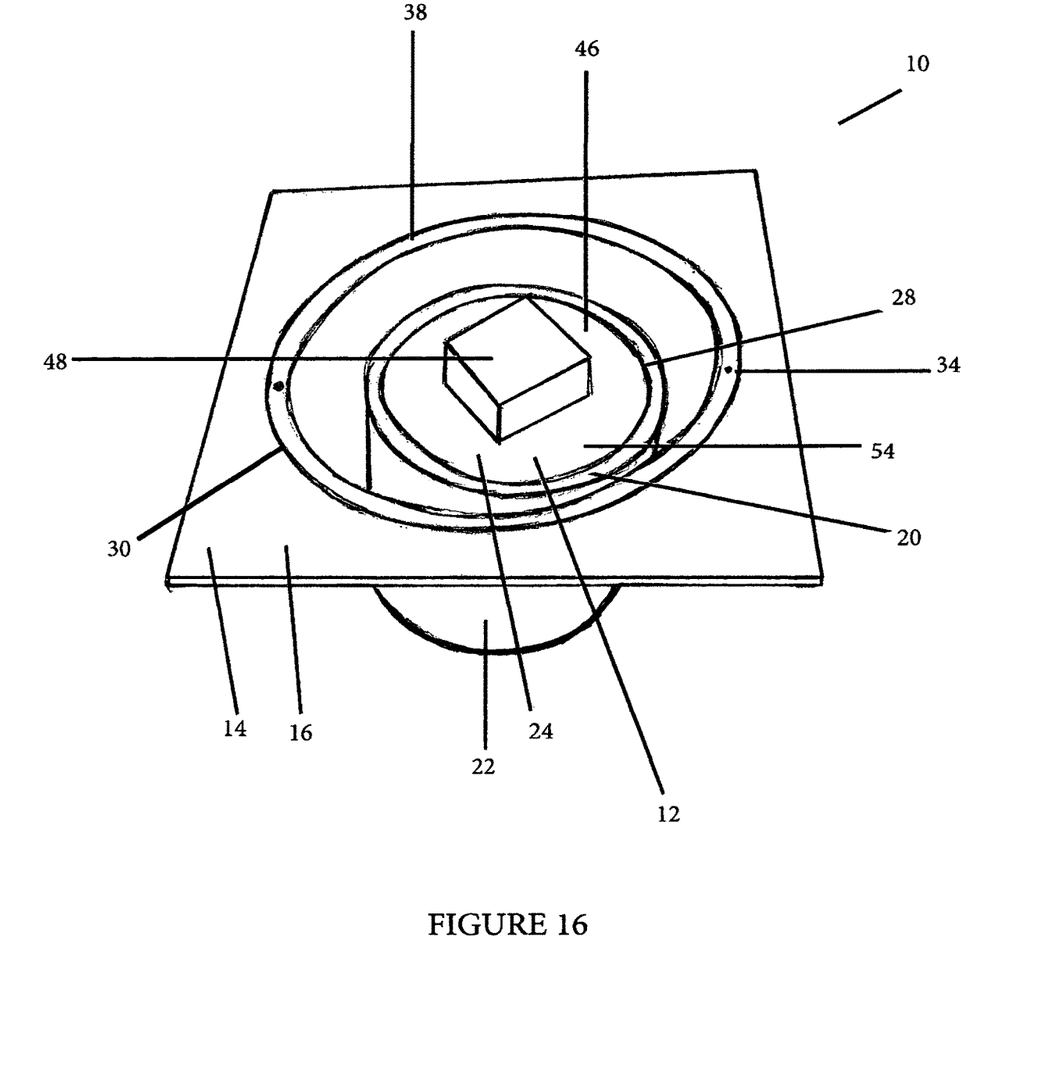
FIG. 16 is a top view of the embodiments shown in FIGS. 14 and 15, depicting that the cleanout remains square while the housing of the access panel rotates around the cleanout into different orientations, including the angled orientation shown.

FIG. 15 depicts another view of the embodiment shown in FIG. 14, but with the cleanout pipe 20 being coupled to another pipe using a coupling device (not shown). FIG. 16 is a top view of the cleanout opening 28 and access panel 10 showing the top surface 16 of the access panel 10 in a cocked position. The cleanout pipe 20 and opening 28 remains square while the housing of the access panel 10 rotates around the cleanout pipe into different orientations.

The cover 32 of the access panel 10 is shown as being solid but could have openings in the surface if desired. The cover 32 can be made from a variety of materials, such as PVC, aluminum, brass, etc.

The caps or plugs 36, 46, 54 shown can be flat, flush caps or a cap with a knob.

The access panel 10 can work effectively with differently size pipes. For example, it can work with inch-and-a-half, two-inch, three-inch, four inch and other pipes.

When the tabs 42 or attachment points 56 of the access panel 10 are used to provide different heights for the panel relative to a stud or joist, the tabs/circular members may be breakable or may be cut using a hacksaw or grinder. The tabs 42 shown are triangular in shape, but other sizes and shapes could be used, the invention not being limited to the shape shown. The attachment points 56 are shown as being cylindrical. They could alternatively be other shapes. The tabs 42 or attachment points 56 could be positioned at other positions around the periphery of the bottom surface 18 of the planar member 14.

The access panel 10 is shown as being generally square. Other shapes for the panel could be utilized including other rectangular shapes, round or oval shapes, or other shapes. The cover 32 could also be other shapes than the round shape that is shown, such as square, triangular, oval, or other shapes. The invention is not limited to the shapes shown and, as a result, other sizes and shapes can be used to perform the same function.

An access panel 10 with cleanout includes a planar member 14, a pipe 20, a fastener 26, a closing member 36, 46, 54, and a cover 32. The planar member 14 has a bottom surface 18 and a top surface 16, with an opening 30 extending therethrough. The pipe 20 is coupled to the opening of the planar member 14, with an opening 28 of the pipe 20 being spaced from a top surface 16 of the planar member 14. The fastener 26 is associated with the opening 28 of the pipe 20. The closing member 36, 46, 54 is for coupling with the fastener 26 of the pipe 20 to close the pipe opening 28. The cover 32 is for covering the opening 30 of the planar member 14.

The access panel 10 may also include a bell-shaped lower member 50 attached at an upper end to the bottom surface 18 of the planar member 14 and encircling the pipe 20 at a lower end of the bell-shaped lower member 50. The bell-shaped member 50 may be fixedly attached to the pipe 20. The top surface 16 of the planar member 14 may be perpendicular to a longitudinal axis of the pipe 20.

The bell-shaped lower member 50 may be movable relative to and rotatable relative to the pipe 20. The top surface 16 of the planar member 14 may be angled relative to a longitudinal axis of the pipe 20 or perpendicular to the longitudinal axis of the pipe 20 depending upon the position of the bell-shaped lower member 50 to the pipe 20.

The top surface of the planar member 14 may include the opening 30 for receiving the cover 32 and the bell-shaped lower member 50 may have an opening 58 in a lower end thereof for receiving the pipe 20. The planar member 14 may include a recessed lip 38 positioned around the opening 30 thereof. The recessed lip 38 may have a height that is substantially equal to a height of the cover 32 such that the cover 32 is flush with the top surface 16 of the planar member 14 when installed in the opening 30 of the planar member 14.

Spacers 42, 56 may be coupled to the planar member 14 for spacing the planar member 14 from another surface. The spacers may be tabs 42 positioned on the bottom surface 18 of the planar member 14 for spacing the planar member 14 from another surface. The spacers may be cylindrical members 56 positioned at spaced locations around the planar member 14 for spacing the planar member 14 from another surface. The tabs 42 may be positioned at spaced locations around the bottom of the planar member 14. The cylindrical members 56 may be positioned at the corners of the access panel 10. The spacers 42, 56 may be breakable or can be cut with a tool to shorten the height of the spacers or to remove them completely from the planar member 14.

The planar member 14 may be substantially rectangular and the cover 32 may have a round periphery. The closing member may be a cap or a plug 36, 46, 54. The fastener 26 may comprise screw threads.

In another embodiment, an access panel 10 with cleanout includes a top member 14, a bell-shaped member 50, a pipe 20, screw threads 26 and a closing member 36, 46, 54. The top member 14 may have a bottom surface 18 and a top surface 16, with an opening 30 extending therethrough. The bell-shaped member 50 is attached to the bottom surface 18 of the top member 14 and has a wider diameter at a top end thereof and a smaller diameter at a bottom end thereof, with an opening 58 positioned at the bottom end of the bell-shaped member 50. The pipe 20 extends through the opening 58 at the bottom end of the bell-shaped member 50, with the pipe 20 having a top opening 28 that is spaced from the top surface 16 of the top member 14. Screw threads 26 are associated with the top opening 28 of the pipe 20. The closing member 36, 46, 54 is for coupling with the screw threads 26 of the pipe 20 to close the top of the pipe.

The access panel 10 may also include a cover 32 for covering the opening 30 of the top member 14.

The bell-shaped member 30 may encircle the pipe 20 at a lower end of the bell-shaped member 30, but is not attached to the pipe 20, and the bell-shaped member 30 is tiltable and rotatable relative to the pipe 20. The bell-shaped member 30 may be fixedly attached to the pipe 20.

The term "substantially," if used herein, is a term of estimation.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. An access panel with cleanout comprising:
    a planar member having a bottom surface and a top surface, with an opening extending therethrough;
    a pipe coupled to the opening of the planar member, with an opening of the pipe being spaced from a top surface of the planar member;
    a fastener associated with the opening of the pipe;
    a closing member for coupling with the fastener of the pipe to close the pipe;
    a cover for covering the opening of the planar member; and
    a bell-shaped lower member attached at an upper end to the bottom surface of the planar member and encircling the pipe at a lower end of the bell-shaped lower member;
    wherein the bell-shaped lower member is tiltable and rotatable relative to the pipe and the top surface of the planar member may be angled relative to a longitudinal axis of the pipe or perpendicular to the longitudinal axis of the pipe depending upon the position of the bell-shaved lower member to the pipe.

2. The access panel of claim 1, wherein the top surface of the planar member includes the opening for receiving the cover and the bell-shaped lower member has an opening in a lower end thereof for receiving the pipe.

3. The access panel of claim 1, wherein the planar member includes a recessed lip positioned around the opening thereof, said recess having a height that is substantially equal to a height of the cover such that the cover is flush with the top surface of the planar member when installed in the opening of the planar member.

4. The access panel of claim 1, further comprising:
    Spacers coupled to the planar member for spacing the planar member from another surface.

5. The access panel of claim 4, wherein the spacers are tabs positioned on the bottom surface of the planar member for spacing the planar member from another surface.

6. The access panel of claim 5, wherein the tabs are positioned at spaced locations around the bottom of the planar member.

7. The access panel of claim 4, wherein the spacers are cylindrical members positioned at spaced locations around the planar member for spacing the planar member from another surface.

8. The access panel of claim 7, wherein the cylindrical members are positioned at the corners of the access panel.

9. The access panel of claim 4, wherein the spacers are breakable or can be cut with a tool to shorten the height of the spacers or to remove them completely from the planar member.

10. The access panel of claim 1, wherein the planar member is substantially rectangular and the cover has a round periphery.

11. The access panel of claim 1, wherein the closing member is a cap or a plug.

12. The access panel of claim 1, wherein the fastener comprises screw threads.

13. An access panel with cleanout comprising:
    a top member having a bottom surface and a top surface, with an opening extending therethrough;
    a bell-shaped member attached to the bottom surface of the top member and having a wider diameter at a top end thereof and a smaller diameter at a bottom end thereof, with an opening positioned at the bottom end of the bell-shaped member;
    a pipe extending through the opening of the bottom end of the bell-shaped member, with the pipe having a top opening that is spaced from the top surface of the top member;
    screw threads associated with the top opening of the pipe;
    a closing member for coupling with the screw threads of the pipe to close the top of pipe; and
    wherein the bell-shaped member encircles the pipe at a lower end of the bell-shaped member, but is not attached to the pipe, and the bell-shaped member is tiltable and rotatable relative to the pipe.

14. The access panel of claim 13, further comprising a cover for covering the opening of the top member.

* * * * *